(12) United States Patent
Jordan et al.

(10) Patent No.: US 11,292,575 B2
(45) Date of Patent: Apr. 5, 2022

(54) SYSTEM FOR REDUCING THE INSTALLATION NOISE OF AN AEROPLANE WING

(71) Applicant: CENTRE NATIONAL DE LA RECHERCHE SCIENTIFIQUE, Paris (FR)

(72) Inventors: Peter Jordan, Paris (FR); Andre Cavalieri, Paris (FR); William Wolf, Paris (FR); Selene Piantanida, Paris (FR); Vincent Jaunet, Paris (FR); Jerome Huber, Paris (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 786 days.

(21) Appl. No.: 15/737,505

(22) PCT Filed: Jun. 17, 2016

(86) PCT No.: PCT/EP2016/064080
§ 371 (c)(1),
(2) Date: Apr. 19, 2018

(87) PCT Pub. No.: WO2016/203015
PCT Pub. Date: Dec. 22, 2016

(65) Prior Publication Data
US 2018/0222568 A1    Aug. 9, 2018

(30) Foreign Application Priority Data

Jun. 19, 2015    (FR) ...................................... 1555669

(51) Int. Cl.
*B64C 3/14*     (2006.01)
*B64D 27/18*    (2006.01)
*B64D 33/04*    (2006.01)

(52) U.S. Cl.
CPC ................ *B64C 3/14* (2013.01); *B64D 27/18* (2013.01); *B64D 33/04* (2013.01); *B64C 2003/147* (2013.01)

(58) Field of Classification Search
CPC .... B64C 3/14; B64C 3/10; B64C 3/32; B64C 2003/147; B64D 27/18; B64D 33/04; B64D 33/06
See application file for complete search history.

(56) References Cited

U.S. PATENT DOCUMENTS 3,310,262 A * 3/1967 Robins .................... B64C 30/00
                                                   244/45 R
4,767,083 A * 8/1988 Koenig ................. B64C 21/025
                                                   244/12.3

(Continued)

OTHER PUBLICATIONS

Mengle, V., et al., "Flaperon Modification Effect on Jet-Flap Interaction Noise Reduction for Chevron Nozzles," American Institute of Aeronautics and Astronautics, 13th AIAA/CEAS Aeroacoustics Conference, May 2007, pp. 1-20.

(Continued)

*Primary Examiner* — Medhat Badawi
*Assistant Examiner* — Vicente Rodriguez
(74) *Attorney, Agent, or Firm* — Nixon & Vanderhye

(57) ABSTRACT

In the field of aeronautics, there is disclosed an aircraft with reduced installation noise and specifically an aircraft wing and jet engine system including an aircraft wing and at least one jet engine with high bypass ratio attached to the wing, suitable for emitting a jet intercepted by a first portion of the trailing edge of the wing. The range formed by the set of angles with orientation α defined by a vector following the direction of the jet and by a vector following the tangent at a point of the first portion of the trailing edge and oriented towards the wing tip of the wing, is included within a range (Continued)

of angles selected from the range delimited by 5° and 65°, and the range delimited by 115° and 175°.

18 Claims, 9 Drawing Sheets

(56) References Cited

U.S. PATENT DOCUMENTS

| | | | | |
|---|---|---|---|---|
| 6,138,957 | A * | 10/2000 | Nastasi | B64C 3/10 |
| | | | | 244/219 |
| 7,823,840 | B2 * | 11/2010 | Shmilovich | B64C 9/38 |
| | | | | 244/215 |
| 8,061,655 | B1 * | 11/2011 | Manley | B64C 1/00 |
| | | | | 244/119 |
| 8,317,129 | B1 * | 11/2012 | Lawson | B64D 27/18 |
| | | | | 244/215 |
| 8,371,124 | B2 * | 2/2013 | Chase | F02K 1/00 |
| | | | | 60/770 |
| 8,651,429 | B2 * | 2/2014 | Czech | B64C 9/18 |
| | | | | 244/215 |
| 2007/0023571 | A1 | 2/2007 | Kawai et al. | |
| 2009/0057493 | A1 * | 3/2009 | Sankrithi | B64D 27/18 |
| | | | | 244/35 R |
| 2016/0152318 | A1 * | 6/2016 | Alexander | B64C 3/32 |
| | | | | 244/13 |

OTHER PUBLICATIONS

Finney, C., et al., "The Near Pressure Field of Co-Axial Subsonic Jets," J. Fluid Mech., vol. 611, 2008, pp. 175-204.

Cavalieri, A., et al., "Axisymmetric Superdirectivity in Subsonic Jets," J. Fluid Mech., vol. 704, 2012, pp. 388-420.

French Search Report issued in Application No. 1555669, dated May 3, 2016.

European Search Report issued in Application No. PCT/EP2016/064080, dated Sep. 27, 2016.

* cited by examiner

SYSTEM FOR REDUCING THE INSTALLATION NOISE OF AN AEROPLANE WING

BACKGROUND OF THE INVENTION

Field of the Invention

The invention relates to an aircraft with reduced installation noise and specifically to an aircraft wing and jet engine system.

Noise reduction is one of the main considerations in the design of aircraft jet engines. Typically, the noise emitted by a jet engine is reduced by increasing its diameter. A multiple-flow jet engine design makes it possible to increase this diameter while ensuring lower fuel consumption at take-off and at cruising speeds. A dual-flow jet engine can, for example, be characterised by its bypass ratio, that is to say the ratio of the mass-flow of air which bypasses the core of the jet engine to the mass-flow of air which passes through the core of the jet engine and is involved in combustion. This technique is particularly applied to civil transport aircrafts whose cruising velocity is, for example, between Mach 0.6 and Mach 0.9. The bypass ratios of airliners can be greater than 12 and are classified as UHBPR (ultra-high-bypass-ratio).

The use of a jet engine with a large diameter requires reducing the distance separating the surface of the wing and the part of the jet engine to which it is closest. In operation, bringing these two parts closer favours an interaction between the turbulent flow of the jet from the engine and the solid surface presented by the wing. This interaction causes a sound emission, called installation noise.

Description of the Related Art

Mengle et al. (Mengle, V. G., Stoker, R. W., Brusniak, L., Elkoby, R., & Thomas, R. H., 2007, May, Flaperon modification effect on jet-flap interaction noise reduction for chevron nozzles, 13th AIAA/CEAS Aeroacoustics Conference, 28th AIAA Aeroacoustics Conference, p. 3666) disclose several devices enabling, to a certain extent, the reduction of installation noise. The flap, attached to the wing in interaction with the jet from the jet engine, comprises a saw tooth trailing edge and/or vortex generators, such as tips. The size of these devices is substantially twenty less than the diameter of the jet engine. The effects of these two devices are assessed with and without the presence of saw teeth on the nozzle of the jet engine. The presence of saw teeth on the nozzle of the jet engine enables a reduction in the direct noise of the jet engine, but the reductions in installation noise provided by the modification of the flaps attached to the wing are marginal.

BRIEF SUMMARY OF THE INVENTION

The invention aims to overcome at least one of the aforementioned disadvantages of the prior art.

One purpose of the invention making it possible to achieve this aim is a device comprising:
an aircraft wing;
at least one jet engine with high bypass ratio attached to said wing, suitable for emitting a jet intercepted by a first portion of the trailing edge of said wing;
characterised in that:
the range formed by the set of angles with orientation α defined by a vector following the direction of said jet and by a vector following the tangent at a point of said first portion of the trailing edge and oriented towards the wing tip of said wing, is included within a range of angles selected from the range delimited by 5° and 65°, and the range delimited by 115° and 175°.

Advantageously, the device comprises at least one said first portion of the trailing edge which is linear, said angle α being constant and included within a range of angles selected from the range delimited by 5° and 65°, and the range delimited by 115° and 175°, and preferably included within a range of angles selected from the range delimited by 40° and 65°, and the range delimited by 115° and 140°.

Advantageously, said wing of said device comprises at least one fixed main portion of which a portion of the rear longitudinal edge is suitable for intercepting said jet, and wherein the range formed by the set of angles with orientation α' defined by a vector following the direction of said jet and a vector following the tangent at each point of said portion of the rear longitudinal edge and oriented towards the wing tip of said wing, is included within a range of angles selected from the range delimited by 5° and 65°, and the range delimited by 115° and 175°.

Advantageously, in a device wherein each said angle α' is included within the range delimited by 5° and 65°, the average over the length of said rear longitudinal edge of the angles with orientation γ' formed by a vector following the direction of a said jet and a vector following the tangent at a point of said rear longitudinal edge not belonging to each said portion of the rear longitudinal edge and oriented towards the wing tip of said wing, is at least 10° greater than the average of the angles α' of each said portion of the rear longitudinal edge.

Advantageously, in a device wherein each said angle α' is included within the range delimited by 115° and 175°, the average over the length of said rear longitudinal edge of the angles with orientation γ' formed by a vector following the direction of a said jet and a vector following the tangent at a point of said rear longitudinal edge not belonging to each said portion of the rear longitudinal edge and oriented towards the wing tip of said wing, is at least 10° less than the average of the angles α' of each said portion of the rear longitudinal edge.

Advantageously, in a device wherein each said angle α is included within the range delimited by 5° and 65°, the average over the length of said trailing edge of the angles with orientation γ formed by a vector following the direction of a said jet and a vector following the tangent at a point of said trailing edge not belonging to each said first portion of the trailing edge and oriented towards the wing tip of said wing, is at least 10° greater than the average of the angles α of each said first portion of the trailing edge.

Advantageously, in a device wherein each said angle α is included within the range delimited by 115° and 175°, the average over the length of said trailing edge of the angles with orientation γ formed by a vector following the direction of a said jet and a vector following the tangent at a point of said trailing edge not belonging to each said first portion of the trailing edge and oriented towards the wing tip of said wing, is at least 10° less than the average of the angles α of each said first portion of the trailing edge.

Advantageously, the ratio of the distance between the main axis of the jet engine and the wing, to the diameter of said jet at the exit of said jet engine is less than 2, and preferably less than 1.5.

Advantageously, the maximum velocity of the gas flow at the exit of said jet engine of said device is between 0.3 Mach and 0.9 Mach and preferably between 0.6 Mach and 0.8 Mach.

Advantageously, the Strouhal number of the gas flow around said wing of said device is less than 1.5, and preferably less than 1.

Another purpose of the invention is an aircraft comprising at least two devices described above.

The following description presents several example embodiments of the device of the invention: these example embodiments do not limit the scope of the invention. These example embodiments have both the essential characteristics of the invention and additional characteristics associated with the embodiments considered. For the sake of clarity, the same elements bear the same references in the various figures.

BRIEF DESCRIPTION OF THE DRAWINGS

The invention will be better understood and other advantages, details and characteristics thereof will emerge during the explanatory description which follows, given by way of example with reference to the annexed drawings wherein.

DETAILED DESCRIPTION OF THE PREFERRED EMBODIMENTS

Figure 1:
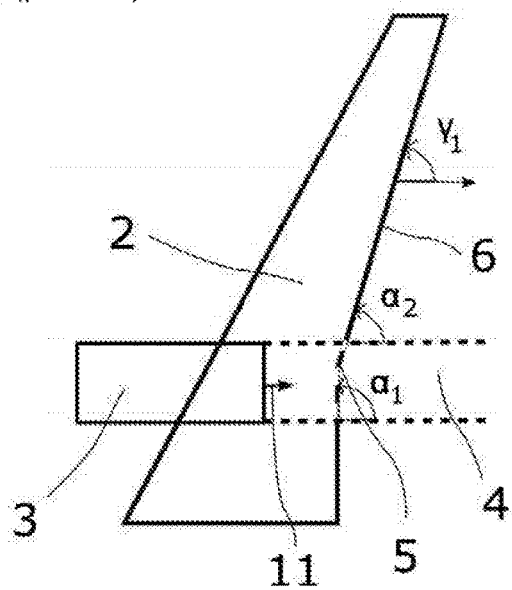
FIG. 1 schematically illustrates a top view of the system constituted of a jet engine and an aircraft wing according to an example of the prior art and according to an embodiment of the invention.
Figure 1:
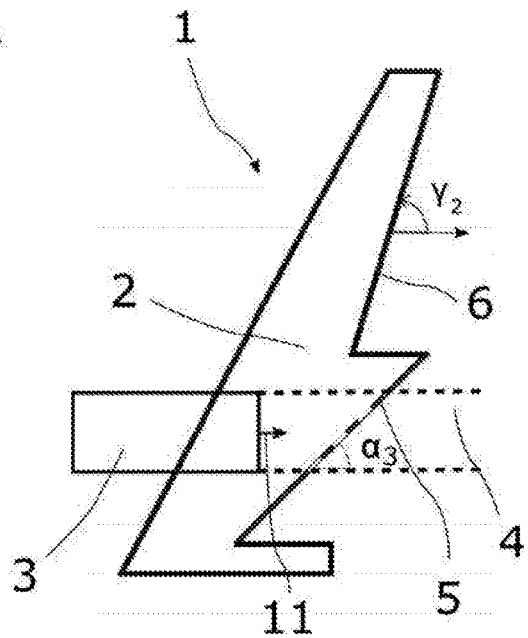

FIG. 1 schematically illustrates a top view of a system constituted of a jet engine 3 and an aircraft wing 2 according to an example of the prior art and according to an embodiment of the invention. Panel A of FIG. 1 schematically illustrates a top view of the system according to an example of the prior art and whose profile of the wing 2 is substantially that of the wing of an Airbus A320 aircraft. Jet 4 from the jet engine, delimited by short dotted lines, is in interaction with the trailing edge of the wing 2. Two portions can be distinguished in the trailing edge: a first portion of the trailing edge 5 in interaction with the jet 4, represented by long dotted lines, and a second portion 6 of the trailing edge comprising the portion or portions of the trailing edge not belonging to the first portion 5 of the trailing edge.

The angle or angles with orientation formed by a vector following the direction 11 of the jet 4 and by a vector following the tangent at a point of the first portion 5 of the trailing edge 5 and oriented towards the wing tip, or end of the wing 2 are denoted α.

The angle or angles with orientation formed by a vector following the direction 11 of the jet 4 and by a vector following the tangent at a point of the first portion 6 of the trailing edge 5 and oriented towards the wing tip, or end of the wing 2 are denoted γ.

In the device illustrated in Panel A of FIG. 1, two angles α are illustrated along the first portion 5 of the trailing edge: from bottom to top, $\alpha_1$ which in this example is substantially equal to 90°, then $\alpha_2$, which in this example is substantially equal to 70°. In the second portion 6 of the trailing edge an angle γ is illustrated: the angle $\gamma_1$, substantially equal to 70°.

Panel B of FIG. 1 schematically illustrates a top view of the system 1 according to an example embodiment of the invention. As in Panel A of the same figure, the jet 4 of the jet engine, delimited by short dotted lines, is in interaction with the trailing edge of the wing 2. Two portions can be distinguished in the trailing edge: a first portion 5 of the trailing edge in interaction with the jet 4, represented by long dotted lines, and a second portion 6 of the trailing edge comprising the portion or portions of the trailing edge not belonging to the first portion 5 of the trailing edge. The angle or angles with orientation formed by a vector following the direction 11 of the jet and a vector following the tangent at a point of the first portion 5 of the trailing edge and oriented towards the wing tip are denoted α. The angle or angles formed by a vector following the direction 11 of the jet and a vector following the tangent at a point of the second portion 6 of the trailing edge and oriented towards the wing tip are called γ.

In the device illustrated in Panel B of FIG. 1, according to an embodiment of the invention, an angle α is illustrated along the first portion 5 of the trailing edge: $\alpha_3$ is substantially equal to 45°. In the second portion of the trailing edge 6, an angle γ is illustrated, $\gamma_2$, substantially equal to 70°.

More generally, in the embodiments of the invention, the first portion 5 of the trailing edge can comprise a range of angles α between 5° and 65° or (in the exclusive sense) between 115° and 175°. In a particular embodiment of the invention illustrated by Panel B of FIG. 1, the first portion of the trailing edge is linear, and the angle α is constant and is between 5° and 65° or (in the exclusive sense) between 115° and 175°.

We can define the average of the angles α, <α> over the length of the first portion 5 of the trailing edge and the average of the angles γ, <γ> over the length of the second portion of the trailing edge. Advantageously, the wing, in embodiments of the invention, can be characterised by the inequality $\langle\gamma\rangle > \langle\alpha\rangle + 10°$ in the case where the angles α belong to the angle range delimited by 5° and 65°, and $\langle\gamma\rangle < \langle\alpha\rangle - 10°$ in the case where the angles α belong to the angle range delimited by 115° and 175°. These inequalities reflect the presence of a higher sweep angle along the portions of the trailing edge in interaction with the jet or jets.

In all embodiments of the invention described, "jet engine" is considered to be a jet engine with high bypass ratio, that is to say a jet engine whose bypass ratio is greater than 5 and preferably greater than 10. Indeed, bringing these types of jet engine close to the wing 2 is one of the major causes of installation noise.

Figure 2:
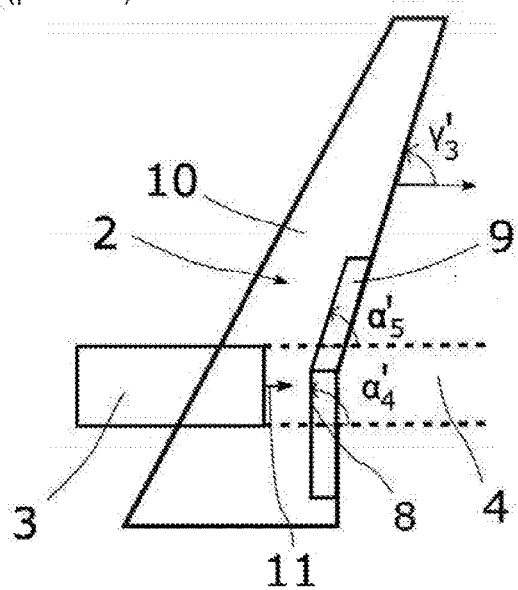
FIG. 2 schematically illustrates a top view of a system constituted of a jet engine and an aircraft wing comprising two flaps, according to an example of the prior art and according to an embodiment of the invention.
Figure 2:
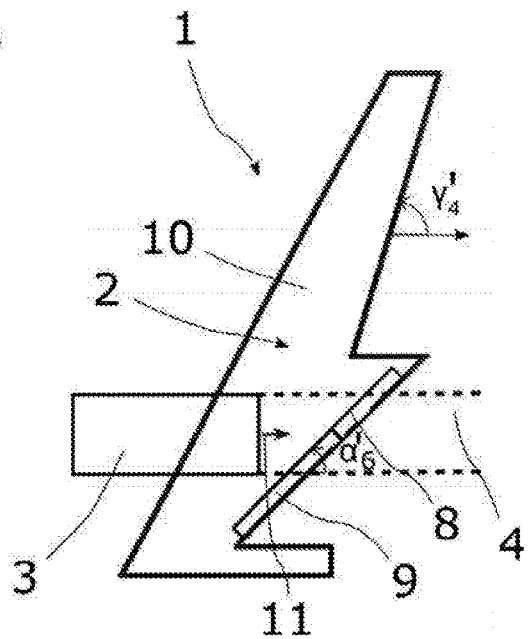

FIG. 2 schematically illustrates a top view of a system constituted of a jet engine 3 and an aircraft wing 2 comprising two flaps 9, according to an example of the prior art and according to an embodiment of the invention. Panel A of FIG. 2 schematically illustrates a top view of the system according to an example of the prior art and whose profile of the wing 2 is substantially that of the wing of an Airbus A320 aircraft. The jet 4 from the jet engine, delimited by short dotted line, is in interaction with the trailing edge of the wing 2 and with a portion 8 of the rear longitudinal edge of the fixed main portion 10 of the wing 2.

The angle or angles formed by a vector following the direction 11 of the jet 4 and a vector following the tangent at a point of the portion 8 of the rear longitudinal edge of the fixed main portion 10 and oriented towards the wing tip are denoted α'. The angle or angles formed by a vector following the direction 11 of the jet 4 and a vector following the tangent at a point of the rear longitudinal edge of the fixed main portion 10 of the wing and oriented towards the wing tip, not belonging to the portion 8, are denoted γ'.

In the device illustrated in Panel A of FIG. 2, two angles α' are illustrated along the portion 8 of the rear longitudinal edge: from bottom to top, α'$_4$ which in this example is substantially equal to 90°, then α'$_5$, which in this example is substantially equal to 70°. In a portion of the rear longitudinal edge not belonging to the portion 8, an angle γ' is illustrated: the angle γ$_3$ is substantially equal to 70°.

Panel B of FIG. 2 schematically illustrates a top view of the system 1 according to an example embodiment of the invention. As in Panel A of the same figure, the jet 4 from the jet engine, delimited by short dotted lines, is in interaction with the trailing edge of the wing 2 and with a portion 8 of the rear longitudinal edge of the fixed main portion 10 of the wing 2. The angle or angles formed by a vector following the direction 11 of the jet and a vector following the tangent at a point of the portion 8 of the rear longitudinal edge and oriented towards the wing tip, are denoted α'. The angle or angles formed by a vector following the direction 11 of the jet 4 and a vector following the tangent at a point of the rear longitudinal edge of the fixed main portion 10 of the wing and oriented towards the wing tip, not belonging to the portion 8, are denoted γ'.

In the device illustrated in Panel B of FIG. 2, according to an embodiment of the invention, an angle α' is illustrated along the portion 8 of the rear longitudinal edge of the fixed portion 10: α'$_6$ is substantially equal to 45°. In the portion of the rear longitudinal edge not belonging to the portion 8, an angle γ'$_4$ is illustrated, substantially equal to 70°.

More generally, in the embodiments of the invention, the portion 8 of the rear longitudinal edge of the fixed portion 10 of the wing, can comprise a range of angles α' between 5° and 65° or (in the exclusive sense) between 115° and 175°. In a particular embodiment of the invention illustrated by Panel B of FIG. 2, the first portion 8 of the rear longitudinal edge is linear, and the angle α'$_6$ is constant and is between 5° and 65° or (in the exclusive sense) between 115° and 175°.

We can define the average of the angles α', <α'> over the length of the first portion 8 of the rear longitudinal edge and the average of the angles γ', <γ'> over the length of the rear longitudinal edge not belonging to the portion 8. Advantageously, the wing, in embodiments of the invention, can be characterised by the inequality ⟨γ'⟩>⟨α'⟩+10° in the case where the angles α' belong to the angle range delimited by 5° and 65°, and ⟨γ'⟩<⟨α'⟩−10° in the case where the angles α' belong to the angle range delimited by 115° and 175°. These inequalities reflect the presence of a higher sweep angle (or a stall) along the portions 8 of the rear longitudinal edge in interaction with the jet or jets.

Figure 3:
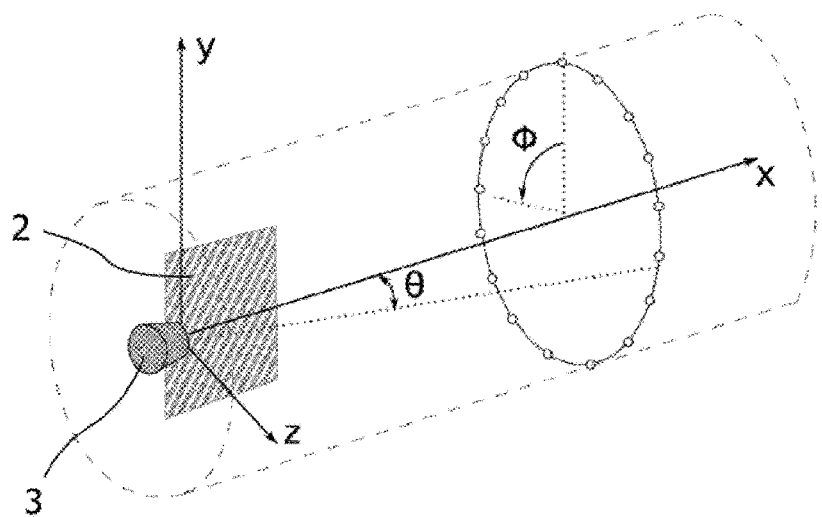
FIG. 3 schematically illustrates an experimental system for measuring installation noise.

FIG. 3 schematically illustrates an experimental system for measuring installation noise. The experiments for measuring the noise of the devices are carried out in an anechoic chamber whose cut-off frequency is 212 Hz. A wing 2 is installed on a fixed jet engine 3 in this chamber. The nozzle of the jet engine 3 used has a diameter D of 0.05 m. The acoustic measurements are carried out by a circular array of microphones or acoustic sensors, disposed around the x-axis (shown in FIG. 3 by small circles).

The sweep angle β is defined by π/2 from which is subtracted from the angle α or γ formed by the direction 11 of the jet from the jet engine and the direction formed by a point of the trailing edge of a wing, i.e. β=π/2−α and β=π/2−γ. The direction 11 of the jet from the jet engine defines the x-axis. A reference coordinate system (x,y,z) can be defined with respect to this axis, as described in FIG. 3.

Flat wings can be mounted in the experimental measuring device so that their flat surface is parallel to the jet. We can, for example, vary the sweep angles β of these wings between 0 and 45°, the velocity of the jet M in Mach in a range between 0.4 Mach and 0.9 Mach and the radial distance r from the main axis of the jet engine (along the x-axis) to the wing in the range defined by 0.6<r/D<2.

For each measurement, an azimuthal array of 18 microphones, or acoustic sensors, is used. Its radius $r_m$ is defined by $r_m$/D=14.3. Its axial position (along the x-axis) can vary so as to measure the acoustic field on a cylindrical surface containing the device 1 constituted of the wing and the jet engine. The measurement range can be defined by −2.5<x/D<39. FIG. 3 also illustrates the polar (θ) and azimuthal (Φ) angles conventionally used.

The experimental device described in FIG. 3 can be numerically modelled in several ways. Two methods used are described: the use of a tailored Green's function (TGF) and the use of the boundary element method (BEM). A kinematic wave packet is used as a sound source in the two types of modelling.

Figure 4:
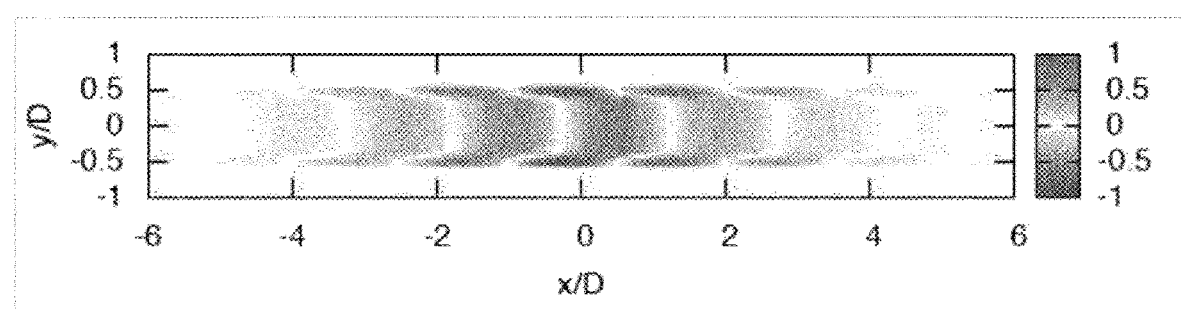
FIG. 4 illustrates intensities of hydrodynamic fluctuations in a plane of a wave packet used to represent the jet in numerical modellings of the device.

FIG. 4 illustrates intensities of hydrodynamic fluctuations in a plane of a wave packet used to represent the jet in numerical modellings of the device. The profile of the wave packet was defined using average measurements of the acoustic emission of an uninstalled jet, that is to say a jet without wings. The wave packet modelled can be written in the following form:

$$T_{xx}(x, r, m, \omega) = 2\rho_0 \bar{u}_x(r)\hat{u}_x(r, m, \omega)e^{-ik_H x}e^{-\frac{x^2}{L^2}} \qquad (1)$$

In (1), $\bar{u}_x(r)$ represents the average profile of the velocities at x=D. The velocity fluctuations) $\hat{u}_x(r,m,\omega)$ are modelled by linear instability waves of pulse ω and of azimuthal mode m by using the average profile of the velocities of a parallel flow. The axial wavenumber $k_H$ is determined by using linear stability results. The source is a convected wave enclosed in a Gaussian envelope. The free parameters (the amplitude and the length scale L) are deduced from measurements of the far-field pressure of the uninstalled jet. The calculation of the radiation of the sound, made using Lighthill's acoustic analogy without surface effects, enables a good matching of the model to the experiments, for low polar angles (described in Cavalieri, A. V., Jordan, P., Colonius, T., & Gervais, Y., 2012, Axisymmetric superdirectivity in subsonic jets, Journal of fluid Mechanics, 704, 388-420). We can choose, for example, to model an asymmetric jet with m=0 and M=0.6 Mach. The asymmetric mode generally dominates the radiation as it dominates the irrotational part of the hydrodynamic nearfield (described in Tinney, C. E., & Jordan, P., 2008, The near pressure field of co-axial subsonic jets, Journal of Fluid Mechanics, 611, 175-204).

The sound radiated by the source in the presence of various wings is then calculated using two tools simulating the propagation.

The sound field can be calculated via a convolution of the sound source with a tailored Green's function, used to simulate the presence of a semi-infinite, rigid, flat wing, and for which a rotation along the z-axis is possible in order to account for the effect associated with the variations of the sweep angle.

The far-field pressure is described by:

$$p(x, \omega) = \int_v \frac{\partial^2 T_{ij}}{\partial y_i \partial y_j}(y, \omega) G(x, y, \omega) dy, \quad (2)$$

where x and y are the positions of the observer and of the source, and, respectively, $T_{ij}$ represents the components of the stress tensors and w the angular frequency. The Green's function G for a rigid, semi-infinite, flat wing is given (Williams, J. E., & Hall, L. H., 1970, Aerodynamic sound generation by turbulent flow in the vicinity of a scattering half plane. Journal of Fluid Mechanics, 40(04), 657-670) by:

$$G(x, y, \omega) = \frac{e^{\frac{1}{4}i\pi}}{\sqrt{\pi}} \left[ \frac{e^{-ikR}}{4\pi R} \int_{-\infty}^{u_R} e^{-ju^2} du + \frac{e^{-ikR'}}{4\pi R'} \int_{-\infty}^{u_{R'}} e^{-iu^2} du \right] \quad (3)$$

where $k=\omega/c_0$ is the acoustic wavenumber, R is the distance between the observer and the source, R' is the distance between the observer and the image source. Considering cylindrical coordinates (r,θ,z) whose origin is located on the trailing edge of the wing, the z-axis parallel to the trailing edge, θ=0 on the surface of the wing and 0<θ<2π, we have:

$$u_R = 2\sqrt{\frac{kr_0 r_s}{B+R}} \cos\left(\frac{\theta_O - \theta_S}{2}\right), \quad (4)$$

$$u_{R'} = |2\sqrt{\frac{kr_0 r_s}{B+R'}} \cos\left(\frac{\theta_O + \theta_S}{2}\right)| \text{ and} \quad (5)$$

$$B = \sqrt{(r_O + r_S)^2 + (z_O - z_S)^2} \quad (6)$$

where the subscripts S and O refer respectively to the coordinates of the source and the observer. The Fresnel integrals in (3) are calculated numerically using the method described in Zhang, S., & Jin, J. M., 1996, Computation of special functions, Wiley-Interscience. The far-field solution for the jet alone is obtained using the free-field Green's function $G_0(x,y,\omega)$ given by:

$$G_0(x, y, \omega)| = \frac{e^{-ikR}}{4\pi R} \quad (7)$$

instead of G in equation (2).

The sound field can, alternatively, be calculated using the boundary element method (BEM). This second propagation model is based on the solution of a Helmholtz equation whose boundary conditions correspond to the pressure distribution on the surface of the wing. In this case, the geometry of the wing corresponds precisely to that of the experiment. A formulation using the boundary element method, accelerated by a fast multipole method (FMM) is used. The acoustic pressure for the Helmholtz equation implemented in the context of a BEM formulation is described by:

$$c(x)p(x, \omega) = -\int_s \frac{\partial G_0}{\partial n_y}(x, y, \omega) p(y, \omega) dy + \int_v \frac{\partial^2 T_{ij}}{\partial y_i \partial y_j}(y, \omega) G_0(x, y, \omega) dy \quad (8)$$

where c(x) is equal to ½ when x is on a boundary element surface S and c(x) is equal to 1 when x is in the acoustic field. The term $\partial(\cdot)/\partial n_y$ represents an inward normal derivative calculated at a boundary element y. In the description, the rigid surface boundary conditions are given on the surface of a flat wing, i.e. $\partial p/\partial n_y=0$. The conjugate gradient squared (CGS) iterative scheme is used to solve the system of equations arising from the BEM, and the FMM is used to accelerate the matrix-vector calculations of the CGS scheme.

The following figures show both experimental results using the experimental simulator described in FIG. 3 and numerical results, using the methods described above.

The main effect observed during the experimental measurements of a wing is the low-frequency amplification of the radiated sound (up to 20 dB greater than the uninstalled case). This effect is due to the scattering of the hydrodynamic fluctuation sources by the edge of the wing. The scattered field is directive. The sound maxima are directed perpendicularly to the wing, defined as the "sideline" when the wing is installed vertically. The Strouhal number is defined by St, i.e. St=fD/M, with f the frequency of the wavepacket described in FIG. 4. The amplitude of the low-frequency acoustic amplification (for St<1) is very dependent on the radial separation of the jet engine and the wing. The high-frequency discrepancy between the installed and uninstalled configuration is due to partial incoherent reflections of the incident sound field, which in the case of an infinite wing would be total, that is to say 3 dB.

Figure 5:
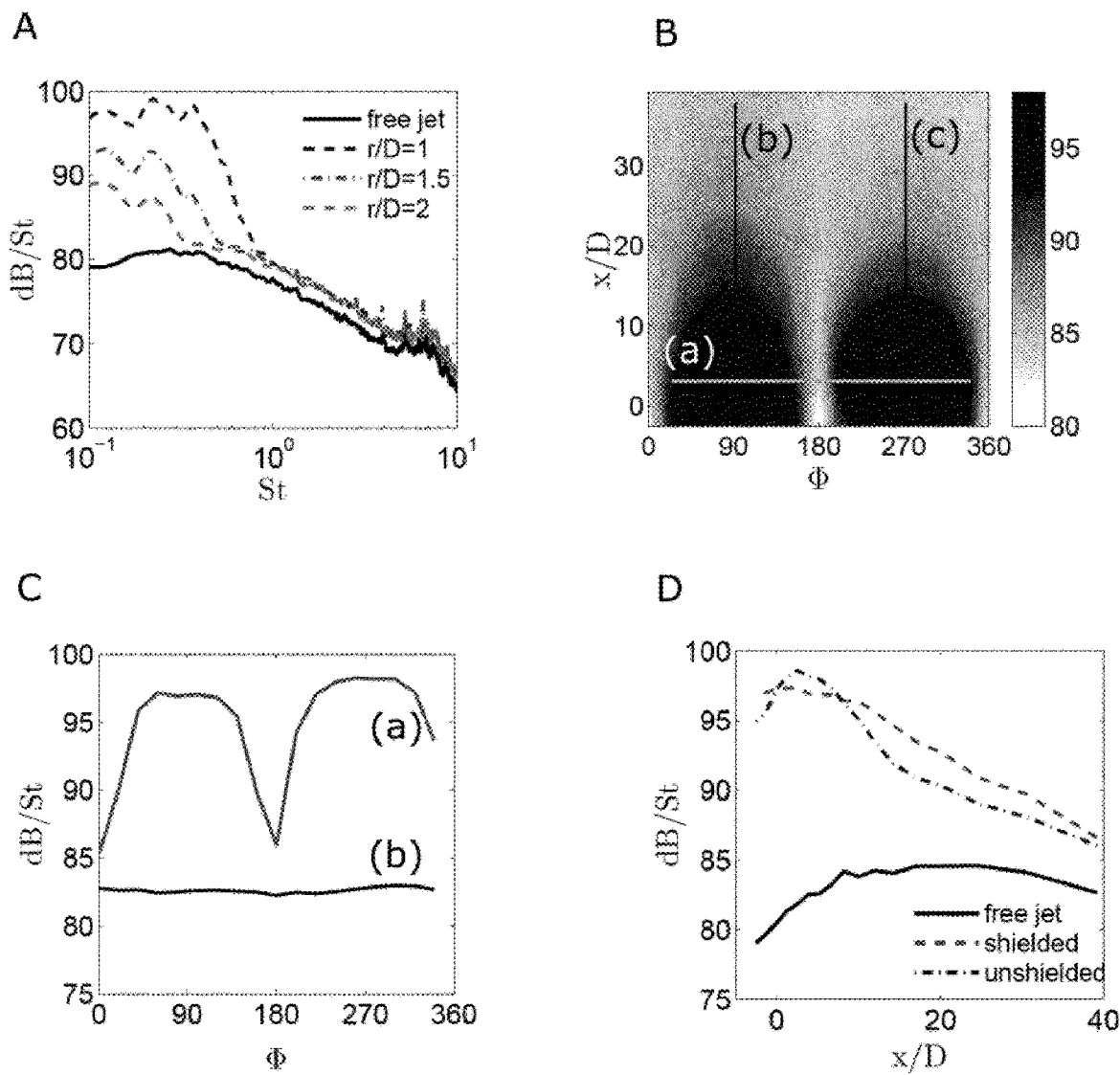
FIG. 5 illustrates different sound pressure levels (SPLs) as a function of the Strouhal number of the device, of the position of the acoustic sensors and of the configuration of the device.

FIG. 5 illustrates different sound pressure levels (SPLs) as a function of the Strouhal number of the device, of the position of the acoustic sensors and of the configuration of the device. Panel A of FIG. 5 illustrates a sound spectrum measured by the undimensioned number dB/St, characteristic of the SPL, as a function of St. The four curves correspond respectively to the case of a jet without wings, and to the conditions of separation of a jet and a wing characterised by r/D=1, 1.5 and 2 (dotted lines). The measurements are made in the case where $(\theta,\Phi)=(90°, 90°)$ (observation perpendicular to the surface of the wing), M=0.4 Mach and the trailing-edge sweep angle $\beta=0°$. In the remainder of the description a shielded side of the jet corresponding to the half-space in which the wing is comprised, whose limit is the (x,y) plane. The other half-space is defined as the unshielded side. The measurements of Panel A of FIG. 5 are made on the unshielded side. In embodiments of the invention, described in FIGS. 1 and 2, the Strouhal number of the gas flow around the wing is less than 1.5, and preferably less than 1.

Panel B of FIG. 5 illustrates a power spectral density (PSD) measured as a function of the axial and azimuthal coordinates of the acoustic sensors. As a maximum of the SPL is observed for St≅0.2 in Panel A of FIG. 5, the effects of the various parameters on the PSD can be advantageously observed in the remainder of the figures at this value of the Strouhal number. The value of the PSD can be displayed as a function of the azimuthal angle $\Phi$ and the axial position x/D on the surface defined by the measurement cylinder. The axial position can also be expressed by a polar angle $\theta$. Panel B illustrates the PSD for St≅0.2. The measurements are made in the case where M=0.4 Mach for a separation between the wing and the jet engine corresponding to r/D=1 and a trailing-edge sweep angle $\beta=0°$. The azimuthal angle of the microphones, $\Phi$ is measured anti-clockwise with respect to the x-axis. The x-coordinates have origin at the nozzle of the jet engine and are positive in the direction 11 of the flow from the jet engine. The effect of the wing on the radiation of the sound at this Strouhal number is reflected in the large lobes appearing in the sideline (for $\Phi=90°$ and $\Phi=270°$) for high polar angles, that is to say a low value of x/D. The amplification can be observed quantitatively with respect to the free-jet condition by considering the azimuthal structure of the PSD for x/D=4, along the axis (a).

Panel C of FIG. 5 illustrates the azimuthal directivity of an uninstalled jet. The SPL (dB/St) is shown as a function of $\Phi$ for the case of a free jet (b) and an installed jet (a), for x/D=4. The measurements are made in the case where $\theta=90°$, in the case of a zero sweep angle and M=0.4 Mach for a separation between the wing and the jet engine corresponding to r/D=1. The dipolar structure of the profile in the case of the installed jet can be assessed by considering the sections (b) and (c) of Panel B of FIG. 5, corresponding respectively to the shielded and unshielded sides. These profiles are plotted in Panel D of FIG. 5.

Panel D of FIG. 5 illustrates the SPL as a function of an axial coordinate. The measurements are made in the case where $\Phi=90°$ and $\Phi=270°$, in the case of a zero sweep angle, M=0.4 Mach and for a separation between the wing and the jet engine corresponding to r/D=1. The three curves show the case of a free jet and, in the case of an installed jet, measurements on the shielded side and on the unshielded side corresponding respectively to the sections (b) and (c) of Panel B of FIG. 5. These curves show that the directivity of the radiated sound is dipolar, that is to say asymmetric: the unshielded side contains a more marked peak. This asymmetry may be associated with two effects. On one hand, the scattered field must radiate through the turbulent jet on the unshielded side. For low polar angles the propagation path through the flow is of the order of several acoustic wavelengths; an interaction between the acoustics and the flow is thus possible. On the other hand, the interference between the direct field and the scattered field is different on either side. The propagation models, based on Lighthill's acoustic analogy, can only account for the second effect.

Figure 6:
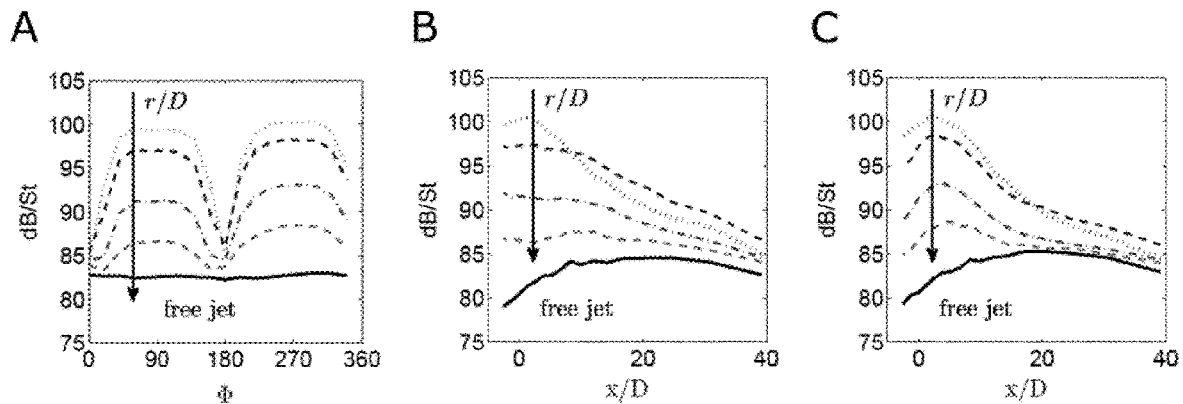
FIG. 6 illustrates polar and azimuthal dependences of the sound field as a function of the radial separation of the wing and the jet engine.

FIG. 6 illustrates polar and azimuthal dependences of the sound field as a function of the radial separation of the wing and the jet engine. The set of panels of the figure shows results for a rectangular wing, at M=0.4 Mach, St=0.2 and $\beta=0°$. Panel A of FIG. 6 shows the dB/St values as a function of the azimuthal directivity for various values of r/D ranging from 0.6 to 2 (respectively in the direction of the arrow). Panel B of FIG. 6 shows the SPL values as a function of the axial dependence for various values of r/D ranging from 0.6 to 2 for the shielded side. Panel C of FIG. 6 shows the SPL values as a function of x/D for various values of r/D ranging from 0.6 to 2 for the unshielded side. The dB/St values are considerably reduced when the jet engine is moved away from the wing, that is to say when r/D is increased. The evolution of the SPL on the sideline is approximately exponential for $1\leq r/D\leq 2$. A change in this evolution occurs between r/D=1 and r/D=0.6. This change is associated with a stronger interaction between the jet and the wing, for example, for r/D=0.6. At this position, two phenomena can coexist: a mean-field deformation, but also a non-negligible grazing flow on the wing. A turbulent boundary layer can also exist, whose interruption on the trailing edge can lead to a scattering of the sound field and constitute an additional source, independent of the source modelled above by wave packets. It is only this latter component which is analysed in the prior art, resulting in, for example, the devices of Mengle et al. The present invention takes into account all the components described.

Figure 7:
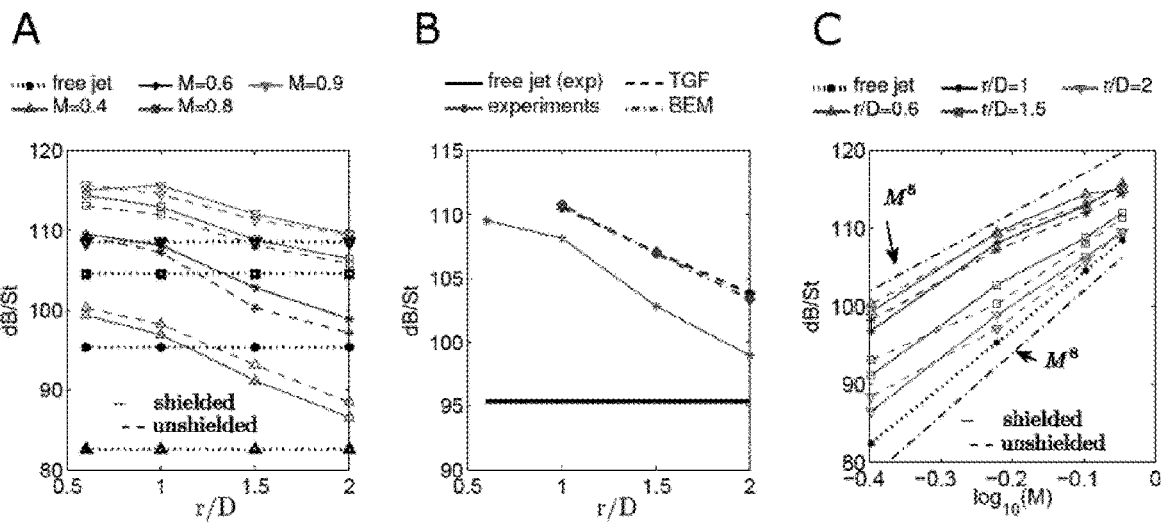
FIG. 7 illustrates the dependence of the scattered acoustic field as a function of the radial separation between the jet engine and the wing and as a function of the velocity of the flow at the exit of the jet engine.

FIG. 7 illustrates the dependence of the scattered acoustic field as a function of the radial separation between the jet engine and the wing and as a function of the velocity of the flow at the exit of the jet engine. Panel A of FIG. 7 illustrates an experimental measurement of the SPL ratio as a function of r/D on the shielded (solid line) and unshielded (dotted line) sides in an installed configuration and in an uninstalled configuration (free jet), using the parameters St=0.2, x/D=4 and $\beta=0°$. Panel B of FIG. 7 illustrates a comparison between the SPL measurements (light solid line) as a function of r/D and the numerical simulations using the TGF (regular dark dotted lines) and BEM (light and irregular dotted lines) method, for M=0.6 Mach. The continuous black baseline illustrates the uninstalled case. The exponential dependence of the scattered field on the radial separation of the wing and the jet engine results from the generation of the sound field by hydrodynamic instabilities, whose fluctuations have exponential amplitude decay, as opposed to compact, stochastic vortices whose nearfield decay is algebraic. This exponential dependence is observed for all considered velocities.

The effect of r/D on the polar directivity is not strong in the range $1\leq r/D\leq 2$. The case of the condition r/D=0.6 is different: a polar peak is observed taking into account both shielded and unshielded sides. Panel B of FIG. 7 illustrates the capacity of the models to capture the effect of varying r/D. Both the TGF and the BEM enable the evolution of the measurements to be captured. The modelling only relates to the $T_{11}$ component of the linearised Lighthill source term, at azimuthal mode m=0. It can be noted that considering the results on the sideline, the TGF and BEM methods have comparable results.

Panel C of FIG. 7 illustrates the dependence of the experimental measurements of the SPL on the velocity M for various r/D ratios and in an uninstalled configuration. The SPL is illustrated for measurements with the pairs $(\theta,\Phi)=(75°, 90°)$ (solid lines) and $(\theta,\Phi)=(75°, 270°)$ (dotted lines), indicating a velocity dependence varying as a function of the radial separation and tending towards the uninstalled case.

The dependence of the SPL on r/D described in Panels A and B of FIG. 7 provide a good model of the technical problem encountered during the use of a jet engine with high bypass ratio. In embodiments of the invention, described in FIGS. 1 and 2, the r/D ratio in the case of a jet engine with high bypass ratio is less than 2 and preferably less than 1.5. Similarly, the dependence of the SPL on M described in Panel C of FIG. 7 models the effect of the flow velocity of a jet engine with high bypass ratio on the installation noise. In embodiments of the invention, the cruising velocity of the jet engine with high bypass ratio can be between 0.3 and 0.9 Mach.

Figure 8:
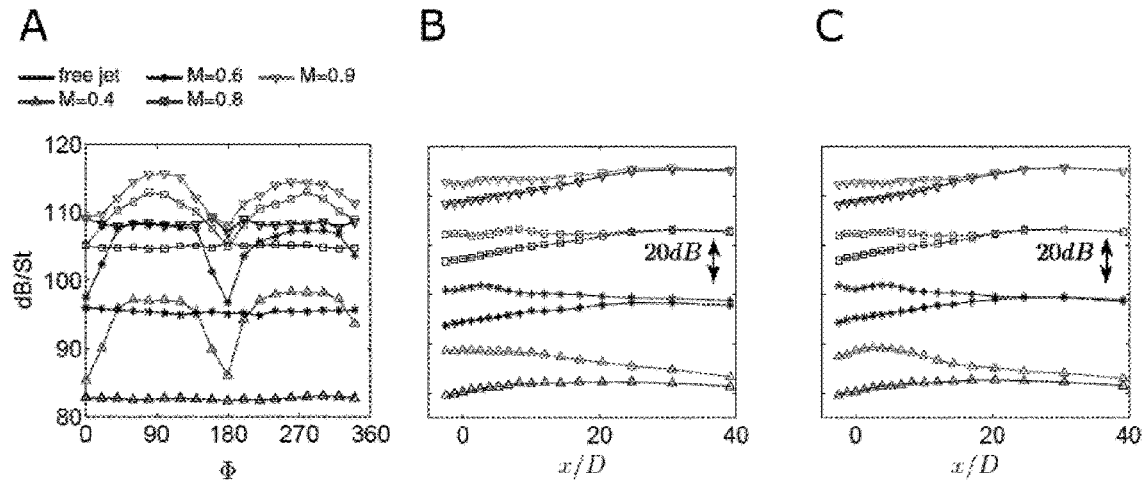
FIG. 8 illustrates the SPL variations as a function of the flow velocity M at the exit of a jet engine.

FIG. 8 illustrates the SPL variations as a function of the flow velocity M at the exit of a jet engine. In each of the panels of FIG. 8, the black curves correspond to an uninstalled configuration. We observe that when the velocity M increases, the amplitude of the noise of the jets in installed configuration increases. However, the effect of the wing is attenuated by the noise specific to the jet ("direct" noise) for increasing velocity values. The relative amplitude of the lobes presented by measuring on the sideline thus decreases for increasing velocities. This effect can be attributed to the different velocity dependences of the measured fields in installed and uninstalled configurations. Comparing Panels B and C of FIG. 8 enables the polar directivity to be illustrated. Panel B of FIG. 8 shows measurements of the SPL as a function of x/D in uninstalled configuration and in installed configuration on the shielded side. Panel C of FIG. 8 shows measurements of the SPL as a function of x/D in uninstalled configuration and in installed configuration on the unshielded side. For an increasing velocity, the signature of the scattered field becomes constrained to angles of a polar nature: at M=0.4 Mach, the scattering component is observed for all polar angles, while at M=0.9 Mach, the amplification is limited to x/D<20. Additional lobes associated with secondary scatterings from other edges and corners of the wing can also be observed in Panels B and C of FIG. 8. This effect, and the capacity of the models to capture them, will be clearer in the remainder of the description by considering the PSD figures.

Figure 9:
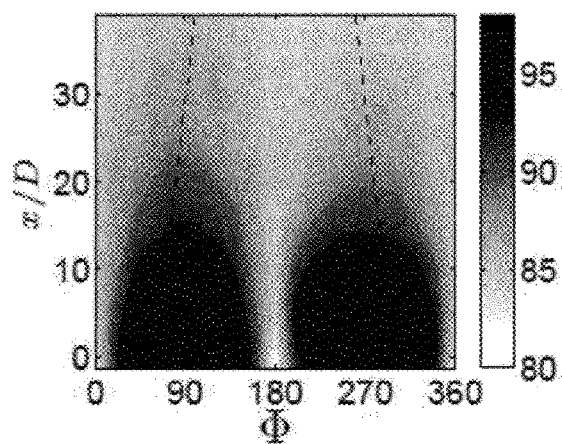
FIG. 9 illustrates the effect of the sweep angle on the scattering of the installation noise.
Figure 9:
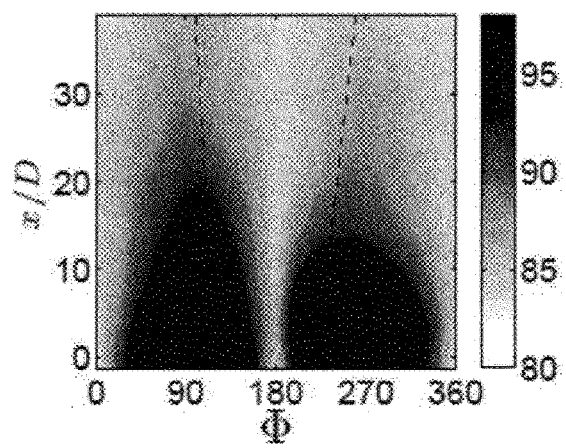
Figure 9:
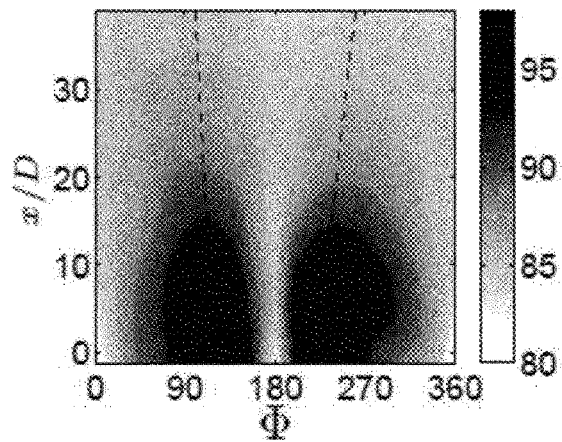
Figure 9:
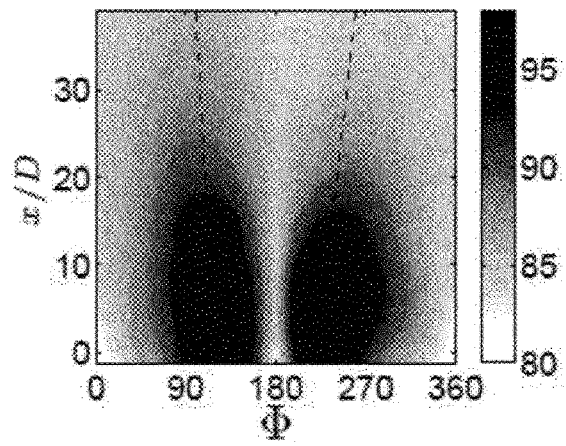

FIG. 9 illustrates the effect of the sweep angle on the scattering of the installation noise. Panel A of FIG. 9 illustrates the PSD as a function of x/D and $\Phi$ for a sweep angle $\beta=0°$. Panel B of FIG. 9 illustrates the PSD as a function of x/D and $\Phi$ for a sweep angle $\beta=15°$. Panel C of FIG. 9 illustrates the PSD as a function of x/D and $\Phi$ for a sweep angle $\beta=30°$. Panel D of FIG. 9 illustrates the PSD as a function of x/D and $\Phi$ for a sweep angle $\beta=45°$. The parameters M=0.4 and r/D=1 are chosen for the representations of the PSDs of FIG. 7 in all the panels. The effect of the variation of the sweep is most marked at highly polar angles, at which, as described in the figures above, the scattering is strongest. The sweep angle varies from 0° to 45° during the experiments. Three main effects are observed as the sweep angle is varied. The radiation lobes become progressively narrower in azimuth as the sweep angle is increased. The position of the radiation peaks rotates to become aligned with the lines represented by the dotted lines in all the panels of FIG. 9. Finally, the inventors discovered a major reduction in the noise produced at the positions $\Phi=90°$ and $\Phi=270°$ as the sweep angle $\beta$ is increased.

Figure 10:
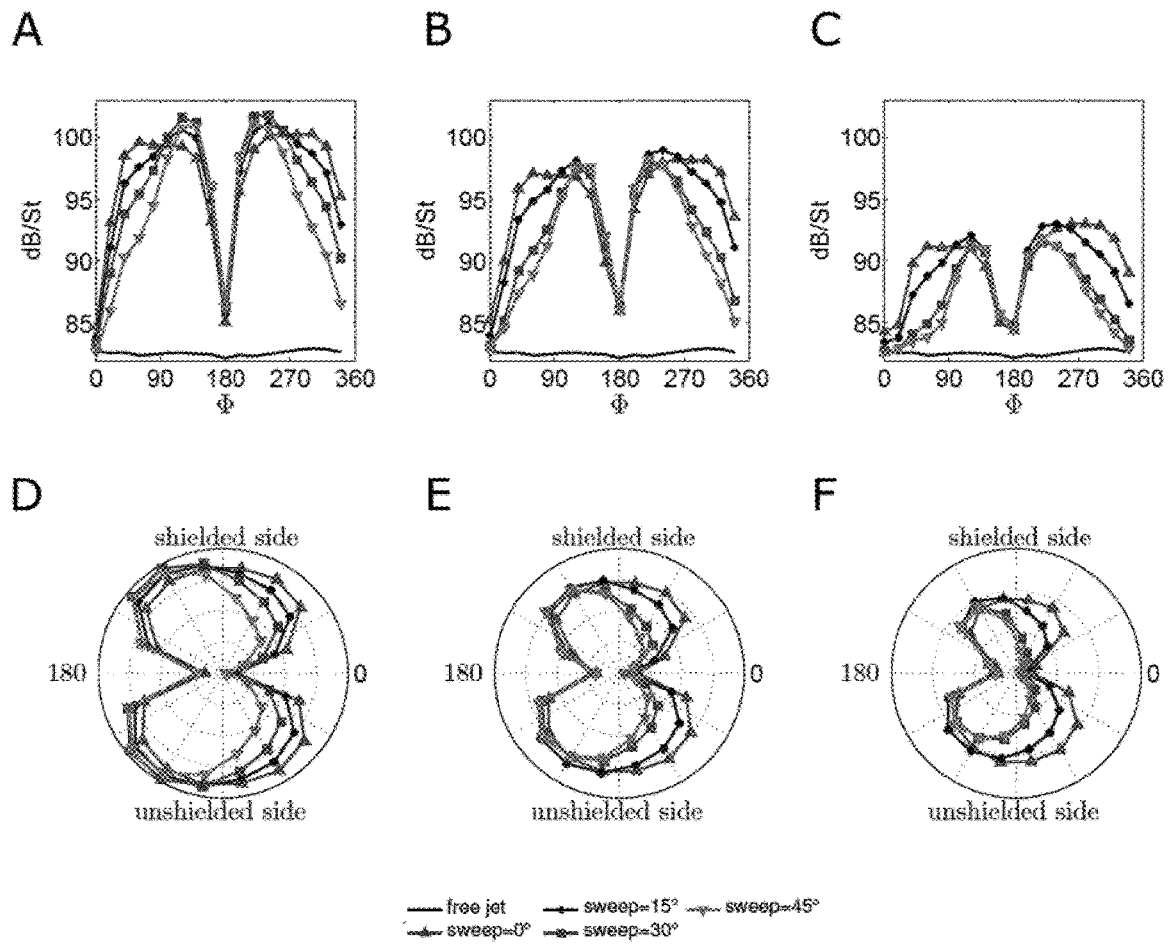
FIG. 10 illustrates the effect of the sweep angle on the scattering of the installation noise.

FIG. 10 illustrates the effect of the sweep angle on the scattering of the installation noise. We observe in all the panels of FIG. 10 the azimuthal directivity along the section (a) of FIG. 5 for three different radial separations between wing and jet engine (r/D=0.6 for Panels A and D, r/D=1 for Panels B and E, r/D=1.5 for Panels C and F). Panels A and D show the same SPLs, in an unfolded representation in Panel A and in a folded representation in Panel D. Similarly, Panels B and E show the same SPLs, in an unfolded representation in Panel B and in a folded representation in Panel E. Panels C and F show the same SPLs, in an unfolded representation in Panel C and in a folded representation in Panel F. The noise reduction can reach 8 dB (for all radial positions of the wing). An increase in the SPL at the peak levels can be observed for lower r/D (for example, for r/D=0.6) but the noise reduction covers a wider azimuthal range. An overall noise reduction is observed. This effect can be observed by calculating the sound power crossing the measurement cylinder.

Figure 11:
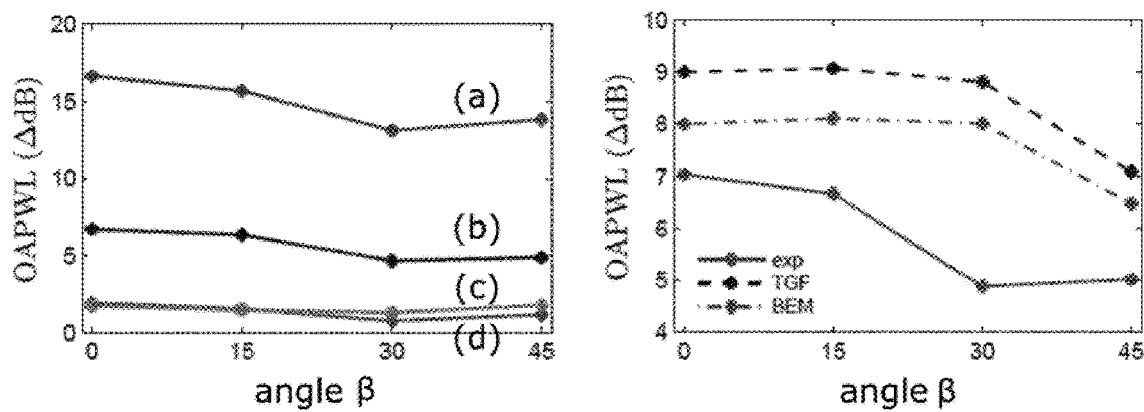
FIG. 11 illustrates the increase in total sound power for different sweep angles and for different flow velocities.
Figure 12:
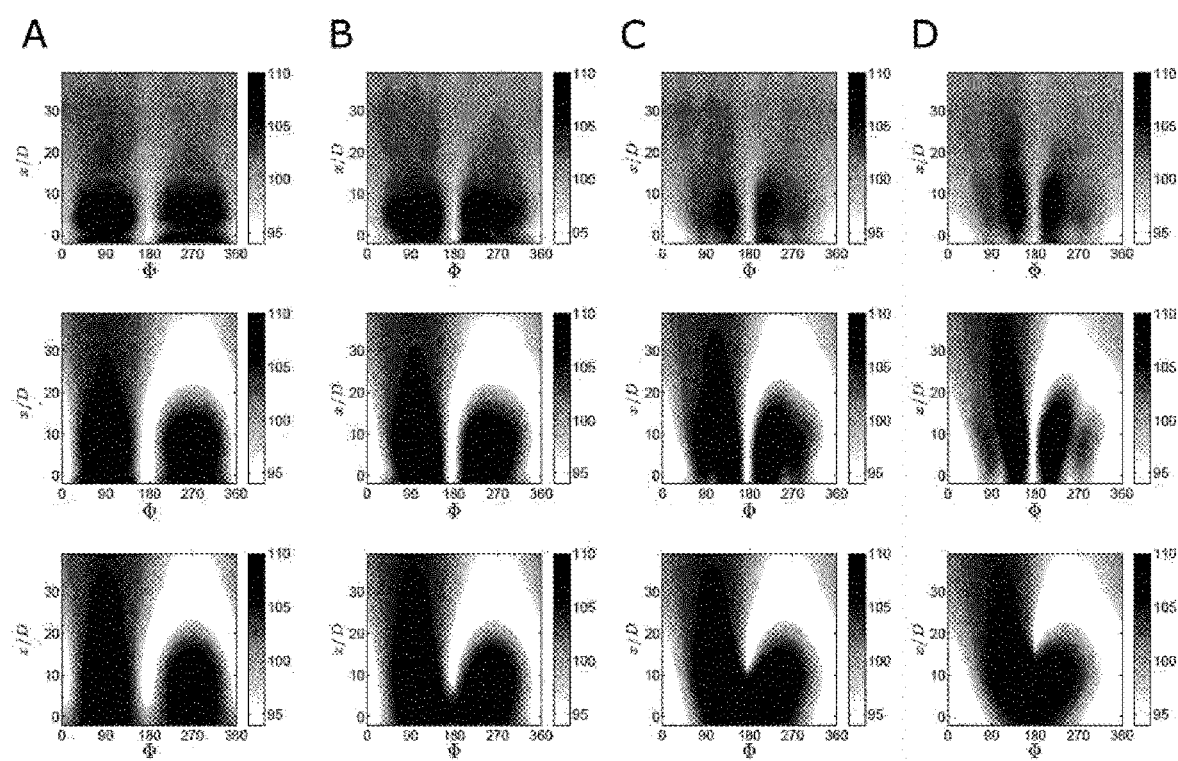
FIG. 12 illustrates the SPLs as a function of Φ and x/D under experimental and numerical simulation conditions for different sweep angles.

FIG. 11 illustrates the increase in total sound power for different sweep angles and for different flow velocities at the exit of the jet engine. Panel A of FIG. 12 illustrates the increase in SPL as a function of $\beta$ for the velocities M=0.4 Mach (a), M=0.6 Mach (b), M=0.8 Mach (c), M=0.9 Mach (d). The results shown in this figure correspond to an installed configuration. For the higher sweep angles, an overall reduction in sound power of up to 3 dB is achieved for the lowest velocity considered, M=0.4. The maximum reduction is attained in the case where $\beta=30°$. The same trend is observed for higher flow velocities M but with a reduction in gain, the contribution of the direct noise of the jet becoming dominant.

Panel B of FIG. 11 illustrates the increase in the SPL for various sweep angles by comparing the results obtained experimentally and with the BEM and TGF numerical methods, for the parameters M=0.6 Mach and r/D=1.

Figure 13:
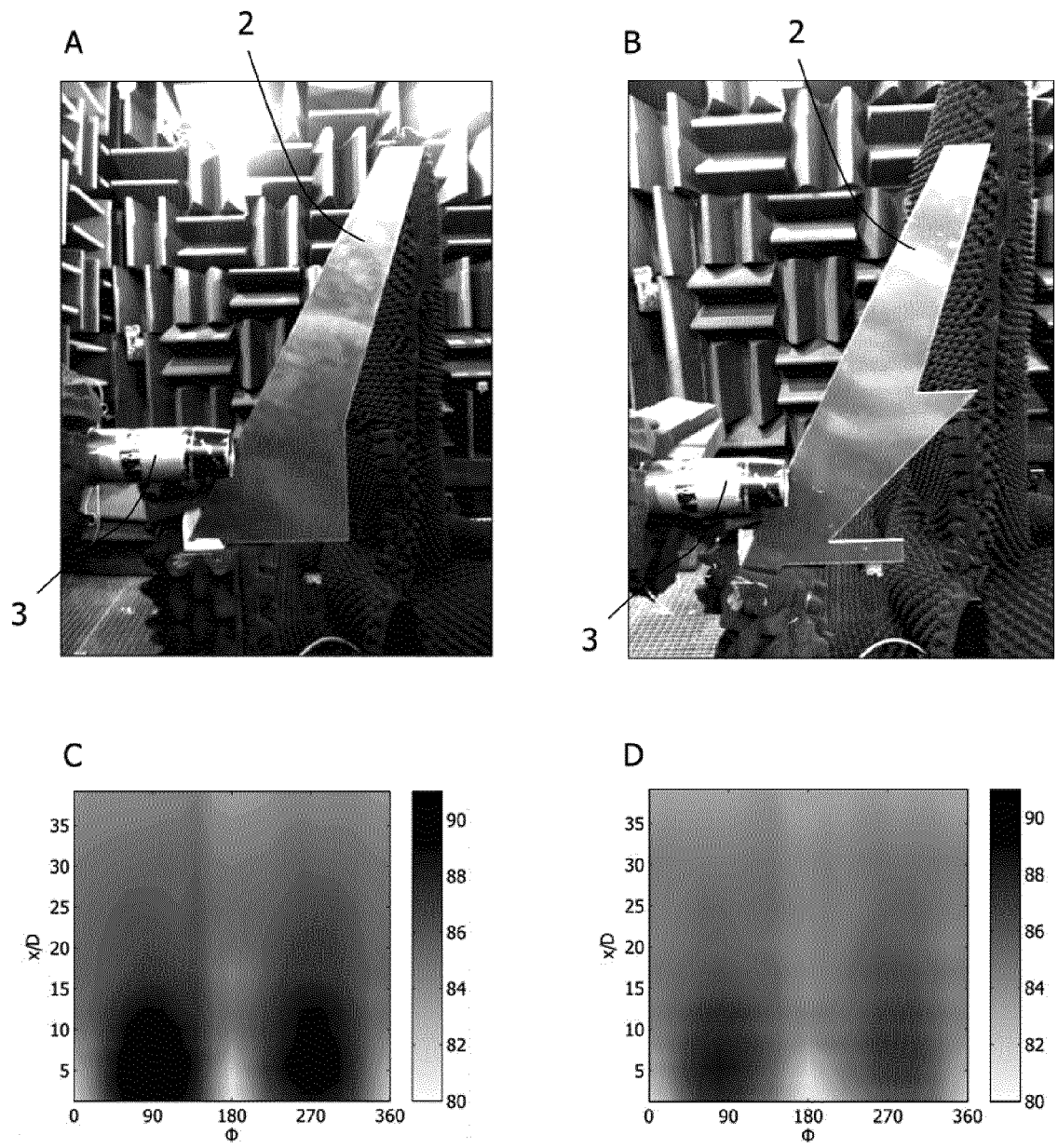
FIG. 13 illustrates the experimental simulations for measuring the noise of wing and jet engine systems.

FIG. 12 illustrates the SPLs as a function of $\Phi$ and x/D under experimental and numerical simulation conditions for different sweep angles. Each of Panel A, B, C and D of FIG. 13 show, from top to bottom, three representations of the SPL: at the top the experimental results, in the middle the results of numerical simulations using the BEM method and at the bottom the results of numerical simulations using the TGF method. Panel A of FIG. 12 corresponds to an angle $\beta=0°$, Panel B of FIG. 12 corresponds to an angle $\beta=15°$, Panel C of FIG. 12 corresponds to an angle $\beta=30°$ and Panel D of FIG. 12 corresponds to an angle $\beta=45°$.

FIG. 13 illustrates the experimental simulations for measuring the noise of wing and jet engine systems. Panel A of FIG. 13 is a photograph of the experimental installation for measuring the installation noise radiated by a wing whose geometry is similar to that of the wings described in Panels A of FIG. 1 and FIG. 2. The geometry of this wing describes that of an A320 airbus. A measurement is made with a jet engine flow velocity M=0.4 Mach. Panel C of FIG. 13 shows the results of measuring the SPL in the configuration described by Panel A of the same figure.

Panel B of FIG. 13 is a photograph of the experimental installation for measuring the installation noise radiated by a wing whose geometry is that of a wing of a system according to an embodiment of the invention. A measurement is made with a jet engine flow velocity M=0.4 Mach. Panel D of FIG. 13 shows the results of measuring the SPL in the configuration described by Panel B of the same figure.

Comparing Panels C and D of FIG. 13 makes it possible to observe a difference in the overall radiated installation noise between a configuration simulating a system of the prior art and a configuration simulating an embodiment of the invention. The radiated installation noise is advantageously lower in the second case. The various embodiments of the invention take advantage of this discovery. The results of FIG. 13 show that the overall shape of the wing can be modified to reduce the installation noise (and not only the flaps or ailerons). The embodiments of the invention comprise an inclined trailing edge, whose sweep angle is defined in FIG. 1, and, in the cases where the wing comprises flaps or ailerons, these latter are not able (mechanically for example) to achieve an incline or a discontinuity of the trailing edge along a length comparable to the wavelength of the source described in FIG. 4. The rear longitudinal edge of the wing can in this case also be at an incline to it, according to an embodiment of the invention, with a sweep angle defined in FIG. 2 to overcome this technical problem.

More generally, the analysis of the physical causes of the installation noise enabled the inventors to discover that the geometric stall, involving an increase in the angle β, of the trailing edge or the rear longitudinal edge in interaction with the jet from the jet engine or jet engines must be of the order of magnitude of the wavelength of the noise source described in FIG. 4, that is to say of the order of magnitude of the jet engine diameter D. More specifically, the length of the first portion 5 of a trailing edge or of the portion 8 of a rear longitudinal edge of the wing can be between 0.2 and 5 times the jet engine diameter D and preferably between one and 5 times the jet engine diameter D. The chevrons implemented in the prior art have, for example, a characteristic size one or two orders of magnitude less (1/15 in Mengle et al.) than the stall described in the various embodiments of the invention, which explains why the jet perceives the average angle of the trailing edge in the prior art and not the exact sweep angles of the chevrons.

Figure 14:
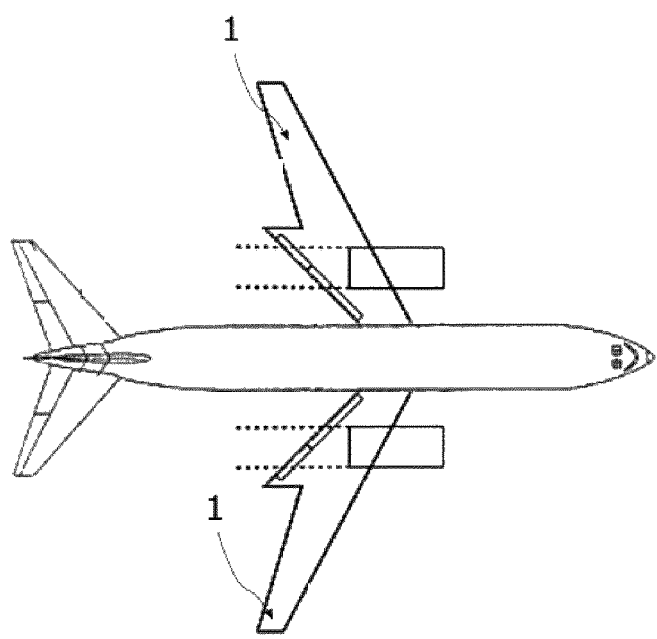
FIG. 14 schematically illustrates a top view of an aircraft comprising systems according to an embodiment of the invention.

FIG. 14 schematically illustrates a top view of an aircraft according to an embodiment of the invention comprising systems 1. The systems 1 comprise wings and jet engines with high bypass ratio described in the embodiments of the invention of FIGS. 1 and 2.

The invention claimed is:

1. A device comprising:
an aircraft wing;
at least one jet engine (3) with high bypass ratio attached to said wing (2), suitable for emitting a jet (4) intercepted exclusively by a first portion (5) of a trailing edge of said wing, wherein angles with orientation $\alpha_3$ are defined by a vector following a direction (11) of the jet (4) and by a vector following a tangent at a point of the first portion (5) of the trailing edge (6) and oriented towards the wing tip of said wing, and angles with orientation $\gamma_2$ are defined by a vector following the direction (11) of the jet and a vector following a tangent at a point of the trailing edge not belonging to the first portion (5) of the trailing edge and oriented towards the wing tip of the wing, wherein:
a range formed by a set of angles with orientation $\alpha_3$, is included within a range of angles selected from a range delimited by 5° and 65°;
an average over a length of said trailing edge (6) of the angles with orientation $\gamma_2$ is at least 10° greater than the average of the angles $\alpha_3$ of each said first portion (5) of the trailing edge when $\alpha_3$ is included within the range delimited by 5° and 65°.

2. The device according to claim 1 wherein at least one said first portion (5) of the trailing edge (6) is linear, said angle $\alpha_3$ is constant and included within a range of angles selected from the range delimited by 5° and 65°.

3. The device according to claim 1 wherein said wing (2) comprises at least one fixed main portion (10) of which a portion (8) of a rear longitudinal edge is suitable for intercepting said jet (4), and wherein a range formed by the set of angles with orientation $\alpha_6'$ defined by a vector following the direction (11) of said jet and a vector following the tangent at each point of said portion (8) of the rear longitudinal edge and oriented towards the wing tip of said wing (2), is included within the range of angles selected from the range delimited by 5° and 65°.

4. The device according to claim 3 wherein each said angle $\alpha_6'$ is included within the range delimited by 5° and 65° and wherein an average over the length of said rear longitudinal edge of angles with orientation $\gamma_4'$ formed by a vector following the direction (11) of a said jet and a vector following the tangent at a point of said rear longitudinal edge not belonging to each said portion (8) of the rear longitudinal edge and oriented towards the wing tip of said wing, is at least 10° greater than the average of the angles $\alpha_6'$ of each said portion (5) of the rear longitudinal edge.

5. The device according to claim 1 wherein the ratio of the distance r between the main axis of the jet engine (3) and the wing (2), to the diameter D of said jet at the exit of said jet engine is less than 2.

6. The device according to claim 1 wherein the maximum velocity of the gas flow at the exit of said jet engine (3) is between 0.3 Mach and 0.9 Mach.

7. An aircraft comprising at least two devices according to claim 1.

8. The device according to claim 2 wherein said wing (2) comprises at least one fixed main portion (10) of which a portion (8) of the rear longitudinal edge is suitable for intercepting said jet (4), and wherein the range formed by the set of angles with orientation $\alpha_6'$ defined by a vector following the direction (11) of said jet and a vector following the tangent at each point of said portion (8) of the rear longitudinal edge and oriented towards the wing tip of said wing (2), is included within a range of angles selected from the range delimited by 5° and 65°.

9. The device of claim 5, wherein the ratio of the distance r between the main axis of the jet engine (3) and the wing (2), to the diameter D of said jet at the exit of said jet engine is less than 1.5.

10. The device according to claim 2 wherein the ratio of the distance r between the main axis of the jet engine (3) and the wing (2), to the diameter D of said jet at the exit of said jet engine is less than 2.

11. The device according to claim 3 wherein the ratio of the distance r between the main axis of the jet engine (3) and the wing (2), to the diameter D of said jet at the exit of said jet engine is less than 2.

12. The device according to claim 4 wherein the ratio of the distance r between the main axis of the jet engine (3) and the wing (2), to the diameter D of said jet at the exit of said jet engine is less than 2.

13. The device according to claim 6 wherein the maximum velocity of the gas flow at the exit of said jet engine (3) is between 0.6 Mach and 0.8 Mach.

14. The device according to claim 2 wherein the maximum velocity of the gas flow at the exit of said jet engine (3) is between 0.3 Mach and 0.9 Mach.

15. The device according to claim 3 wherein the maximum velocity of the gas flow at the exit of said jet engine (3) is between 0.3 Mach and 0.9 Mach.

16. The device according to claim 4 wherein the maximum velocity of the gas flow at the exit of said jet engine (3) is between 0.3 Mach and 0.9 Mach.

17. The device according to claim 5 wherein the maximum velocity of the gas flow at the exit of said jet engine (3) is between 0.3 Mach and 0.9 Mach.

18. The device according to claim 1 wherein at least one said first portion (5) of the trailing edge (6) is linear, said angle $\alpha_3$ is constant and included within a range of angles selected from the range delimited by 40° and 65°.

\* \* \* \* \*